No. 880,332.  
PATENTED FEB. 25, 1908.  
C. S. SCOTT.  
WHEEL RIM FOR PNEUMATIC TIRES.  
APPLICATION FILED MAR. 19, 1907.
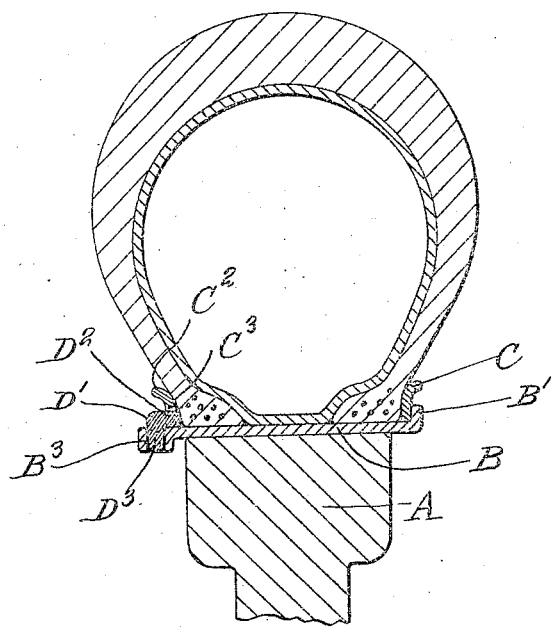
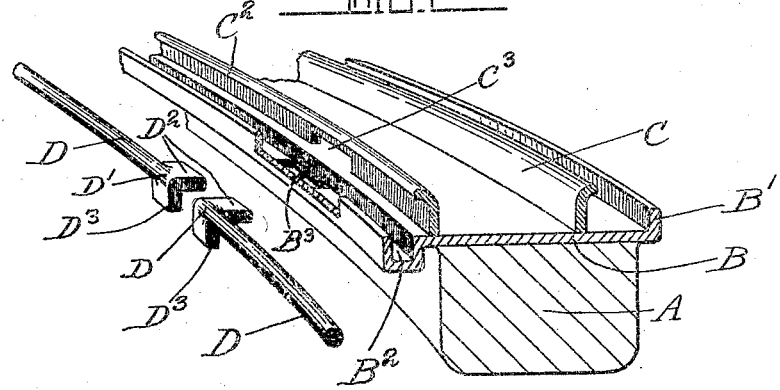

UNITED STATES PATENT OFFICE.

CHARLES S. SCOTT, OF CADIZ, OHIO, ASSIGNOR TO FRANK A. SEIBERLING, OF AKRON, OHIO.

WHEEL-RIM FOR PNEUMATIC TIRES.

No. 880,332.      Specification of Letters Patent.      Patented Feb. 25, 1908.

Application filed March 19, 1907. Serial No. 363,269.

*To all whom it may concern:*

Be it known that I, CHARLES S. SCOTT, a citizen of the United States, and resident of Cadiz, Ohio, have invented a new and useful Improvement in Wheel-Rims for Pneumatic Tires, of which the following is a specification.

My invention relates to a rim construction for pneumatic tires for heavy vehicles, whether these be of the so-called "clencher" or "inextensible-selvage" type, by which the tire may be readily removed when deflated, and, on the other hand, the parts of the rim when assembled are automatically seated, locked into, and held in position by the inflation of the tire.

My invention is an improvement on the construction covered by my Patent No. 816,884, granted April 3, 1906, for detachable pneumatic tires. In this patent I have described and claimed, a vehicle wheel rim having a depressed groove near its detaching edge, in which groove fits a split locking ring which locking ring is passed over the outer edge of the groove and is sprung into the groove to form an abutment for the rim flange, which is annular and inextensible but detachable. The tire-shoe is held in place by the inextensible rim flange and this in turn is held in place by the split locking ring which is sprung into the groove. To detach the pneumatic tire, the locking ring is sprung out of the groove, the annular rim flange comes off the rim and the tire is accessible. All this has been described in my prior patent. It is sometimes necessary for a short time, however, to have the vehicle run on the tire even when this is in a deflated condition. In this case the pressure, due to the resiliency of the material of which the tire shoe is composed, acting against the rim flange, presses the rim flange against the split locking ring with a power insufficient to hold the locking ring in its groove, and it happens, at such times, that this split locking ring, through the action of centrifugal force, flies out of the groove to the danger of the bystander. It is also possible that forces may be brought into play, either at this or at other times, to turn the locking ring or the locking ring and flange circumferentially on the wheel rim. The object of my invention is to overcome these difficulties.

To this end my invention consists in applying a lug or lugs preferably to the ends of the split locking ring. These lugs register with a recess in the endless rim flange thus preventing motion of the locking ring in a direction radial to the wheel, even if the tire be deflated. I further provide a projection or projections on the locking ring to register radially with a recess in the rim thus preventing motion of the locking ring in a circumferential direction. In my preferred construction I secure two L-shaped lugs to the ends of the split locking ring, one arm of each L passing laterally through the recess in the endless flange, and the other arm of each L passing radially through the recess in the rim. Since the L-shaped lugs can be made to fit the side faces of the groove and the top face of the rim near the groove, it will be seen that an exceedingly firm, compact and rigid structure is produced.

In the drawings,—Figure 1 is a cross-section of a wheel rim and tire embodying my invention; and Fig. 2 is a sectional perspective view showing the rim flange on the rim and the locking ring off the rim but ready to be placed thereon.

The felly A has a rim B with an annular raised flange B' against which may abut a detachable annular flange C. Near the detaching edge, the rim B is supplied with a depressed groove B² into which may be sprung the split locking ring D supplied with an L-shaped lug D' having a lateral arm D² and a radial arm D³. The inextensible rim flange C² is supplied with a recess C³ for engaging with the lateral arm D² of the L-shaped lug D'. I naturally prefer to use a lug D' on each end of the split locking ring D and to have these two lateral arms D² fit with some snugness into the recess C³ on the rim flange C². The radial arm D³ of the L-shaped lug D' passes into a recess B³ in that portion of the rim B which defines the groove B². The inside surface of the L-shaped lug D' fits the adjacent corner of the groove so that a compact structure is obtained.

It will now be readily understood that in order to assemble the parts, the rim flange C is first put into place whereupon the inner tube with its tire shoe is slid upon the rim. The rim flange C² is then made to slide over the groove B² and onto the rim. The locking rim D is thereupon sprung into the groove B², the arms D³ of the lugs D' registering with the recess B³ and the inner faces of the lug fitting against the corner of the rim. Care having been taken to place the recess C³ opposite the laterally extending lugs D², the inflation of the tire will now force the rim flange $C^2$ against the locking ring D, thus bringing the recess $C^3$ into engagement with the lugs $D^2$. It is however equally feasible to have the operator slide the rim flange $C^2$ towards the locking ring when this has been sprung into its groove, so as to thereby effect the engagement of the lugs $D^2$ with the recess $C^3$.

It appears that even though the tire be deflated, the ends of the recess $C^3$ will prevent the lugs $D^2$ from spreading in a circumferential direction. At the same time the upper edge of the recess $C^3$ will prevent the lugs from moving in a radial direction. The lugs $D^2$ being thus held immovable, the split locking ring is held in its groove. Furthermore the engagement of the radial lug $D^3$ with the recess $B^3$ prevents any motion of the locking ring in a circumferential direction and as the rim flange $C^2$ is in effect rigidly connected to the locking ring in a circumferential direction, it follows that circumferential motion of the rim flange $C^2$ is also prevented.

The present application covers features of construction not disclosed in my pending application No. 361,220, filed March 8, 1907.

I claim,—

1. The combination of a vehicle wheel rim having a depressed groove near its detaching edge, an inextensible rim flange sliding over the groove onto the rim, a split locking ring sprung into the groove, and a radial projection rigidly secured to the locking ring engaging a recess in the groove to prevent circumferential motion, substantially as described.

2. The combination of a vehicle wheel rim having a depressed groove near its detaching edge, an inextensible rim flange sliding over the groove onto the rim, a split locking ring sprung into the groove, and an L-shaped lug on the end of the locking ring engaging a recess in the groove and a recess in the rim flange, substantially as described.

3. The combination of a vehicle wheel rim having a depressed groove near its detaching edge, an inextensible rim flange sliding over the groove onto the rim, a split locking ring sprung into the groove, and a pair of L-shaped lugs on the ends of the locking ring engaging with a recess in the rim and in the rim flange respectively, substantially as described.

In testimony whereof I have signed my name to this specification in the presence of two subscribing witnesses.

CHAS. S. SCOTT.

Witnesses:
C. M. OSBURN,
J. G. COIL.